US011210968B2

(12) United States Patent
Clevenger et al.

(10) Patent No.: US 11,210,968 B2
(45) Date of Patent: Dec. 28, 2021

(54) BEHAVIOR-BASED INTERACTIVE EDUCATIONAL SESSIONS

(71) Applicant: International Business Machines Corporation, Armonk, NY (US)

(72) Inventors: Lawrence A. Clevenger, Saratoga Springs, NY (US); Stefania Axo, Highland, NY (US); Leigh Anne H. Clevenger, Rhinebeck, NY (US); Krishna R. Tunga, Wappingers Falls, NY (US); Mahmoud Amin, Poughkeepsie, NY (US); Bryan Gury, Raleigh, NC (US); Christopher J. Penny, Saratoga Springs, NY (US); Mark C. Wallen, Highland, NY (US); Zhenxing Bi, Niskayuna, NY (US); Yang Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 16/134,164

(22) Filed: Sep. 18, 2018

(65) Prior Publication Data

US 2020/0090542 A1 Mar. 19, 2020

(51) Int. Cl.
*G09B 19/00* (2006.01)
*G06F 3/0481* (2013.01)
(Continued)

(52) U.S. Cl.
CPC .......... *G09B 19/00* (2013.01); *G06F 3/0481* (2013.01); *G06F 9/453* (2018.02); *G06N 20/00* (2019.01); *G09B 5/065* (2013.01)

(58) Field of Classification Search
None
See application file for complete search history.

(56) References Cited

U.S. PATENT DOCUMENTS 5,487,671 A * 1/1996 Shpiro ..................... G09B 7/04
434/185
7,203,649 B1 * 4/2007 Linebarger .............. G10L 15/18
704/270
(Continued)

FOREIGN PATENT DOCUMENTS

CN 102176222 B 5/2013
CN 104800950 A 7/2015

OTHER PUBLICATIONS

Anonymous, Program Principles—The Son-Rise Program, Autism Treatment Center of America, Principles for treating Autism that make the Son-Rise Program so unique and effective, https://www.autismtreatmentcenter.org/contents/about_son-rise/, Apr. 2, 2005, pp. 1-2.

*Primary Examiner* — William D Ermlick
(74) *Attorney, Agent, or Firm* — Will Stock; Edell, Shapiro & Finnan, LLC

(57) ABSTRACT

A computer system interacts with a user with a behavioral state. An activity performed by an entity with a behavioral state is determined. A virtual character corresponding to the entity and performing the determined activity of the entity is generated and displayed. A mental state of the entity responsive to the virtual character is detected. In response to detection of a positive mental state of the entity, one or more natural language terms are provided to the entity corresponding to the activity performed by the virtual character. Embodiments of the present invention further include a method and program product for interacting with a user with a behavioral state in substantially the same manner described above.

17 Claims, 4 Drawing Sheets

(51) Int. Cl.
*G09B 5/06* (2006.01)
*G06F 9/451* (2018.01)
*G06N 20/00* (2019.01)

(56) References Cited

U.S. PATENT DOCUMENTS

| | | | | |
|---|---|---|---|---|
| 8,209,173 B2* | 6/2012 | Bejar | G10L 15/063 | 704/243 |
| 8,392,190 B2* | 3/2013 | Chen | G10L 17/26 | 704/256.1 |
| 8,909,370 B2 | 12/2014 | Stiehl et al. | | |
| 9,472,207 B2 | 10/2016 | Gondi et al. | | |
| 9,704,103 B2* | 7/2017 | Suskind | G09B 19/04 | |
| 10,311,645 B1* | 6/2019 | Ravindran | G02B 27/0101 | |
| 10,521,946 B1* | 12/2019 | Roche | G06T 13/40 | |
| 2004/0018478 A1* | 1/2004 | Styles | G09B 5/00 | 434/350 |
| 2005/0280660 A1* | 12/2005 | Seo | H04M 1/72544 | 345/629 |
| 2006/0105305 A1* | 5/2006 | Stewart | G09B 17/003 | 434/178 |
| 2007/0015121 A1* | 1/2007 | Johnson | G09B 7/04 | 434/156 |
| 2008/0059578 A1* | 3/2008 | Albertson | G06F 3/017 | 709/204 |
| 2008/0120113 A1* | 5/2008 | Loyall | G06F 3/011 | 704/270 |
| 2009/0063168 A1* | 3/2009 | Finn | G06Q 30/02 | 705/1.1 |
| 2009/0210812 A1* | 8/2009 | Cragun | G06F 3/011 | 715/771 |
| 2009/0226860 A1* | 9/2009 | Garcia | G09B 19/06 | 434/157 |
| 2010/0121630 A1* | 5/2010 | Mende | G06F 40/30 | 704/7 |
| 2010/0233662 A1* | 9/2010 | Casper | G09B 19/04 | 434/185 |
| 2010/0291968 A1* | 11/2010 | Ander | G09B 21/009 | 455/556.1 |
| 2011/0078564 A1* | 3/2011 | Almodovar Herra Iz | G06F 16/58 | 715/262 |
| 2011/0229862 A1* | 9/2011 | Parikh | G09B 5/067 | 434/156 |
| 2011/0262887 A1* | 10/2011 | Cleveland | G09B 7/00 | 434/247 |
| 2011/0306023 A1* | 12/2011 | Blank | G09B 17/003 | 434/178 |
| 2012/0021390 A1* | 1/2012 | Dodd | G09B 19/04 | 434/185 |
| 2012/0270578 A1* | 10/2012 | Feghali | H04L 51/10 | 455/466 |
| 2013/0095460 A1* | 4/2013 | Bishop | G09B 19/00 | 434/308 |
| 2013/0323698 A1* | 12/2013 | Gifford | G09B 19/00 | 434/247 |
| 2014/0051053 A1* | 2/2014 | Parikh | G09B 7/08 | 434/308 |
| 2014/0206428 A1* | 7/2014 | Thompson | G07F 17/32 | 463/20 |
| 2014/0342321 A1* | 11/2014 | Wendt | G09B 7/06 | 434/156 |
| 2014/0356822 A1* | 12/2014 | Hoque | G09B 7/00 | 434/185 |
| 2014/0361974 A1* | 12/2014 | Li | G06F 3/017 | 345/156 |
| 2014/0370470 A1 | 12/2014 | Aristizabal et al. | | |
| 2015/0032670 A1* | 1/2015 | Brazell | G06N 5/04 | 706/11 |
| 2015/0279371 A1* | 10/2015 | Fujioka | G10L 25/48 | 704/275 |
| 2016/0086500 A1* | 3/2016 | Kaleal, III | G06Q 10/10 | 434/257 |
| 2016/0104385 A1* | 4/2016 | Alam | G09B 5/00 | 434/236 |
| 2016/0132290 A1* | 5/2016 | Raux | G06F 3/013 | 704/275 |
| 2016/0171387 A1 | 6/2016 | Suskind | | |
| 2016/0321536 A1* | 11/2016 | Ponomarev | H04J 11/00 | |
| 2017/0053541 A1* | 2/2017 | Tsyrina | G06F 3/167 | |
| 2017/0169555 A1* | 6/2017 | Larocca | G06F 3/04817 | |
| 2017/0333796 A1* | 11/2017 | Do | G09B 19/025 | |
| 2018/0027307 A1* | 1/2018 | Ni | G06K 9/00315 | 345/419 |
| 2018/0144651 A1* | 5/2018 | Abdelhak | G11B 27/031 | |
| 2018/0174344 A1* | 6/2018 | Joo | G06T 11/00 | |
| 2018/0232567 A1* | 8/2018 | Dolsma | G10L 17/26 | |
| 2018/0260448 A1* | 9/2018 | Osotio | G06F 16/24575 | |
| 2018/0342095 A1* | 11/2018 | Walsh | G06K 9/00335 | |
| 2018/0356943 A1* | 12/2018 | Lundin | G06T 13/40 | |
| 2018/0373547 A1* | 12/2018 | Dawes | G06F 16/90332 | |
| 2019/0095775 A1* | 3/2019 | Lembersky | G06N 3/008 | |
| 2019/0163270 A1* | 5/2019 | Da Silva | G06F 1/163 | |
| 2019/0213900 A1* | 7/2019 | Erickson | G06F 3/0482 | |
| 2019/0340419 A1* | 11/2019 | Milman | G06T 15/02 | |
| 2020/0034025 A1* | 1/2020 | Brady | G06T 13/205 | |
| 2020/0090542 A1* | 3/2020 | Clevenger | G06F 3/0481 | |
| 2020/0105265 A1* | 4/2020 | Kuriya | G10L 25/60 | |
| 2020/0111488 A1* | 4/2020 | Ray | G09B 19/04 | |
| 2020/0251014 A1* | 8/2020 | Jones | G09B 5/06 | |
| 2020/0372816 A1* | 11/2020 | Frolov | G09B 5/02 | |
| 2020/0406468 A1* | 12/2020 | Stoianovici | B25J 9/0003 | |

* cited by examiner

BEHAVIOR-BASED INTERACTIVE EDUCATIONAL SESSIONS

BACKGROUND

1. Technical Field

Present invention embodiments relate to interactive educational sessions, and more specifically, to interactive educational sessions in which a user is engaged based on the user's behavior.

2. Discussion of the Related Art

Interactive education refers to a process of facilitating learning that accounts for a pupil's behavior and reactions during lessons. While many educational models have been developed that focus on educating neurologically typical pupils, other approaches to education account for the needs of pupils that exhibit neurologically atypical functions. For example, a pupil who is diagnosed with an autism spectrum disorder may benefit from lesson plans that have been specifically developed for educating autistic individuals. One difficulty in providing an education to neurologically atypical students is ensuring that an instructor can gain the attention of the students.

SUMMARY

According to one embodiment of the present invention, a computer system interacts with a user with a behavioral state. An activity performed by an entity with a behavioral state is determined. A virtual character corresponding to the entity and performing the determined activity of the entity is generated and displayed. A mental state of the entity responsive to the virtual character is detected. In response to detection of a positive mental state of the entity, one or more natural language terms are provided to the entity corresponding to the activity performed by the virtual character. Embodiments of the present invention further include a method and program product for interacting with a user with a behavioral state in substantially the same manner described above.

BRIEF DESCRIPTION OF THE DRAWINGS

Generally, like reference numerals in the various figures are utilized to designate like components.

DETAILED DESCRIPTION

Present invention embodiments relate to interactive educational sessions, and more specifically, to interactive educational sessions in which a user is engaged based on the user's behavior. One difficulty in providing an education to a neurologically atypical student, such as individuals that are diagnosed with an autism spectrum disorder, is engaging the student in a manner that holds the student's attention. Furthermore, since each neurologically atypical student is different, it may be challenging to understand which approaches to education can be successful. Present invention embodiments deliver educational sessions to a user by first gaining the user's attention using an interactive virtual character. The virtual character may be selected based on a user's likes and dislikes. Next, any repetitive actions that are performed by the user are identified, and then virtual character mimics those actions to achieve user engagement. Once the user is engaged, an educational session may be delivered.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
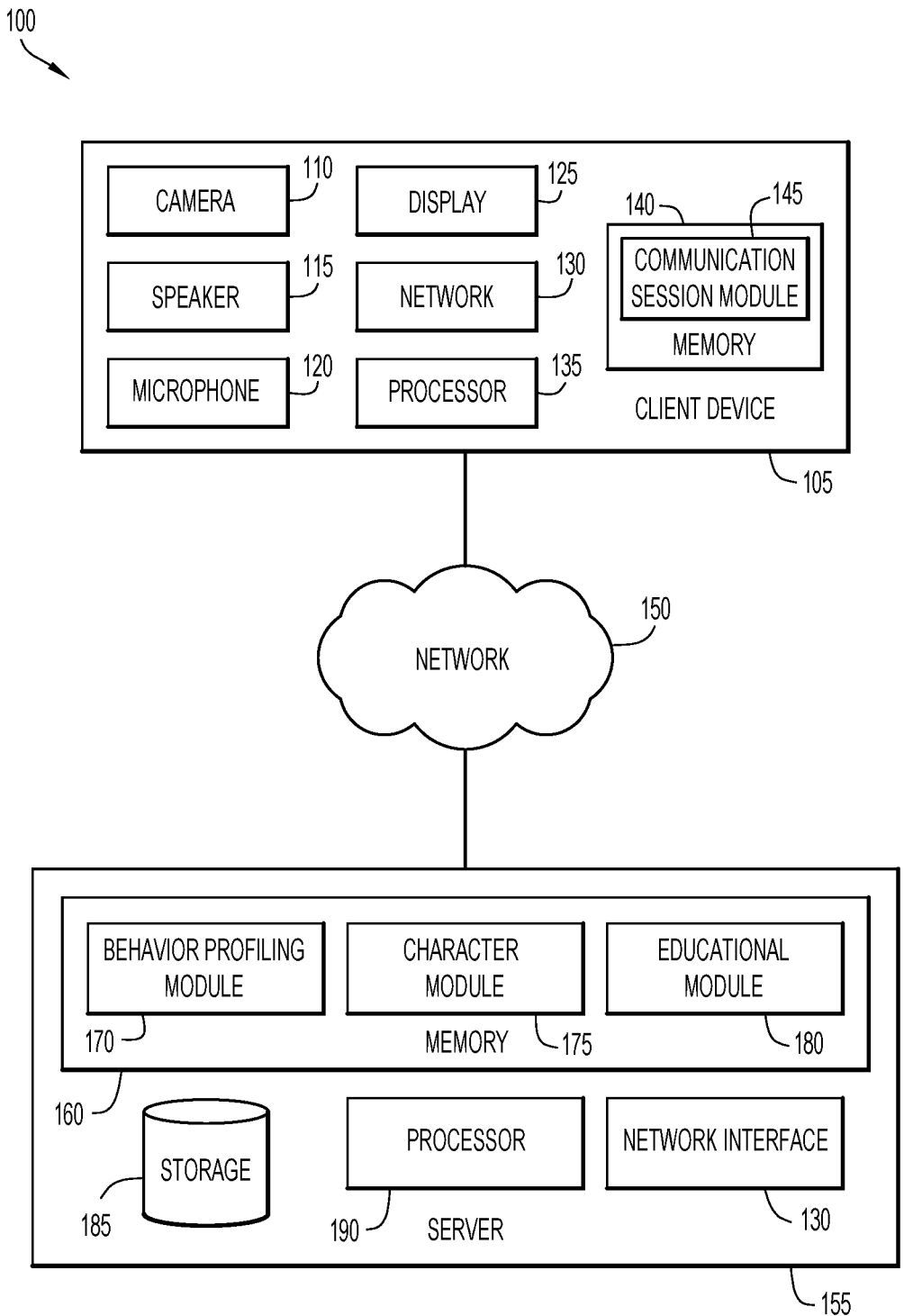
FIG. 1 is a block diagram depicting a computing environment for providing behavior-based interactive educational sessions in accordance with an embodiment of the present invention.

Present invention embodiments will now be described in detail with reference to the Figures. FIG. 1 is a block diagram depicting a computing environment 100 for providing behavior-based interactive educational sessions in accordance with an embodiment of the present invention. As depicted, computing environment 100 includes a client device 105, a network 150, and a server 155. It is to be understood that the functional division among components of computing environment 100 have been chosen for purposes of explaining the present invention and is not to be construed as a limiting example.

Client device 105 includes a camera 110, a speaker 115, a microphone 120, a display 125, a network interface 130, a processor 135, and memory 140 with communication session module 145. In various embodiments of the present invention, client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Client device 105 may include internal and external hardware components, as depicted and described in further detail with respect to FIG. 4.

Camera 110 may be any conventional or other image capture device capable of still photography and/or videography. Speaker 115 may include any transducer capable of converting an electrical signal to sound, and microphone 120 may include any transducer capable of converting sound to an electrical signal. Display 125 may include any output device for presenting information in a visual form, such as a liquid crystal display (LCD), a cathode ray tube (CRT) display, or a light-emitting diode (LED) display. In some embodiments, client device 105 is a virtual reality or augmented reality device, and display 125 may render virtual characters in a three-dimensional environment. When a user interacts with client device 105, data may be captured using speaker 115 and/or microphone 120 that can be analyzed to determine the user's engagement level. A user of client device 105 may also provide input to client device 105 via an input device such as a keyboard or mouse. A virtual character may be displayed on display 125 according to present invention embodiments.

Communication session module 145 may include one or more modules or units to perform various functions of present invention embodiments described below. Communication session module 145 may be implemented by any combination of any quantity of software and/or hardware modules or units, and may reside within memory 140 of client device 105 for execution by a processor, such as processor 135.

Communication session module 145 may present a virtual character that captures a user's attention, and may present interactive educational sessions to a user. In some embodiments, the user is a child. The user may be an individual who is diagnosed with autism or an autism spectrum disorder. Virtual characters may be selected based on the user's interests and reactions. In some embodiments, the virtual character is an animated figure, such as a person or an anthropomorphized animal or object. Communication session module 145 may animate the virtual character so that the virtual character performs actions that are similar to actions performed by a user. For example, if a user spins a ball, then communication session module 145 may depict a virtual character likewise spinning an animated ball. Communication session module 145 may also conduct educational sessions with a user with or without the virtual character. In some embodiments, communication session module 145 may animate the virtual character by providing video and/or audio to give the appearance that the virtual character is speaking to the user, thus enabling the delivery of educational content. For example, communication session module 145 may present an animated virtual character that teaches the user particular words or phrases. Using camera 110 and display 125 and/or speaker 115 and microphone 120, communication session module 145 can establish two-way communication between a user and a virtual character. For example, during an educational session, communication session module 145 may use a virtual character to prompt a user to speak a certain word or phrase, and may repeat a portion of the educational session until the user has said the word or phrase a predetermined number of times.

Network 150 may include a local area network (LAN), a wide area network (WAN) such as the Internet, or a combination of the two, and includes wired, wireless, or fiber optic connections. In general, network 150 can be any combination of connections and protocols that will support communications between client device 105 and server 155 via their respective network interfaces 130 in accordance with embodiments of the present invention.

Server 155 includes a network interface 130, memory 160, at least one processor 190, and a database 185. In general, server 155 and its modules provide behavior-based interactive educational sessions. Client device 105 may share data with server 155 and its modules, including any data gathered from camera 110 and microphone 120. Server 155 may include internal and external hardware components, as depicted and described in further detail with respect to FIG. 4.

Memory 160 includes behavior profiling module 170, character module 175, and educational module 180. Behavior profiling module 170, character module 175, and educational module 180 may include one or more modules or units to perform various functions of present invention embodiments described below. Behavior profiling module 170, character module 175, and educational module 180 may be implemented by any combination of any quantity of software and/or hardware modules or units, and may reside within memory 160 of server 155 for execution by a processor, such as processor 190.

Behavior profiling module 170 may receive one or more pictures and/or videos of a user that may be captured via camera 110. Behavior profiling module 170 may receive pictures and/or video from client device in real time or may receive pictures and/or video that was previously captured. Behavior profiling module 170 may utilize various conventional or other image processing techniques on pictures and/or videos of a user. Behavior profiling module 170 may identify user actions using machine learning techniques. For example, behavior profiling module 170 may identify actions and behaviors performed by a user, including repetitive actions, such as generating sounds, including both non-verbal utterances, such as howling, and verbal utterances. Behavior profiling module 170 may also identify repetitive actions that correspond to physical movements, fidgeting, playing with toys or otherwise manipulating objects, and the like. The repetitive actions that are identified by behavior profiling module 170 may be associated with autism or autism spectrum disorders. Behavior profiling module 170 may also determine a mental state of a user based on the user's identified behavior. For example, behavior profiling module 170 may identify a positive mental state of a user when the user is being still and attentive. Behavior profiling module 170 may identify a negative mental state of a user when a user is being inattentive, which may be evidenced by user behavior such as making verbal or non-verbal utterances, performing repetitive motions, and the like. In some embodiments, behavior profiling module 170 identifies a positive mental state of a user by using gaze tracking to note when a user is looking at display 125. Behavior profiling module 170 may employ various models to perform the learning (e.g., neural networks, mathematical/statistical models, classifiers, etc.). Behavior profiling module 170 may be trained using supervised or unsupervised learning. Thus, behavior profiling module 170 may be trained to identify any sort of actions or behaviors performed by a user.

Character module 175 may select one or more virtual characters and provide virtual characters to communication session module 145 of client device 105. Character module 175 may be provided with information about a user, such as a user's interests (including likes and dislikes) with regard to particular objects, toys, people, and animals. Character module 175 may process the information about the user using conventional or other machine learning algorithms to create a virtual character that has traits relating to a user's likes, and does not have traits that correspond to a user's dislikes. For example, if a user likes panda bears and bows, character module 175 may generate a virtual character of a panda bear wearing a bow on its head. Character module 175 may also generate animations for a virtual character that take into account a user's identified behaviors as well as the user's interests. For example, if the user's interests include panda bears and tops, character module 175 may generate animations of a panda bear spinning a top.

Character module 175 may operate in conjunction with behavior profiling module 170 to iterate through virtual character animations in order to engage a user. As a virtual character is presented to a user, behavior profiling module 170 can process images of the user to determine user engagement. User engagement may be determined according to the user's reactions to virtual character animations, including pupil dilation, facial expressions, and the like. Behavior profiling module 170 may also use gaze tracking to determine if a user is focusing their attention toward the virtual character. Character module 175 may engage a user by animating the virtual character to mimic actions performed by the user. In some embodiments, character module 175 prioritizes actions that correspond to repetitive behaviors exhibited by the user.

When a user is not engaged by the currently-presented virtual character, character module 175 may select different actions for the virtual character to perform, or may select another virtual character. Character module 175 may track which combinations of virtual characters and animated actions are successful or unsuccessful for engaging a user, and save for later use. In some embodiments, character module 175 uses hidden Markov models, decision trees, random forests algorithms, neural nets, ensemble models, and/or combinations thereof to select virtual characters and animated actions that effectively engage a particular user. Models used by character module 175 may be continuously updated based on a user's reactions (e.g., as determined by behavior profiling module 170). Thus, character module 175 may iteratively present virtual characters to a user in a manner that optimizes user engagement.

Educational module 180 may present educational lessons to a user who is engaged by a virtual character. In some embodiments, educational module 180 teaches a language by introducing natural language terms, such as words and phrases, in conjunction with actions performed by the virtual character. Educational module 180 may present the words or phrases in a written form on display 125 and/or in a spoken form that is played through speaker 115 and generated using speech synthesis. For example, while a panda virtual character is animated to smile while spinning a top, educational module 180 may present words or phrases to the user, such as "spin," "top," "panda," "friend," "I am spinning the top," "the top is rotating," and the like. In some embodiments, a human or anthropomorphized animal virtual character is animated to give the user the impression that the virtual character is speaking words or phrases to the user. Educational module 180 may present a virtual character that continues to sound out words or phrases even if the user is not repeating the words or phrases. One or more K-nearest neighbors algorithms or decision tree machine learning algorithms may be utilized to gradually modify the depiction of the virtual character to encourage the user to repeat the words or phrases being taught.

Storage 185 may include any non-volatile storage media known in the art. For example, storage 185 can be implemented with a tape library, optical library, one or more independent hard disk drives, or multiple hard disk drives in a redundant array of independent disks (RAID). Similarly, data on storage 185 may conform to any suitable storage architecture known in the art, such as a file, a relational database, an object-oriented database, and/or one or more tables. Server 155 may use storage 185 to store data, including virtual character data, any data collected by client device 105 and any data generated by server 155 and its modules.

Figure 2:
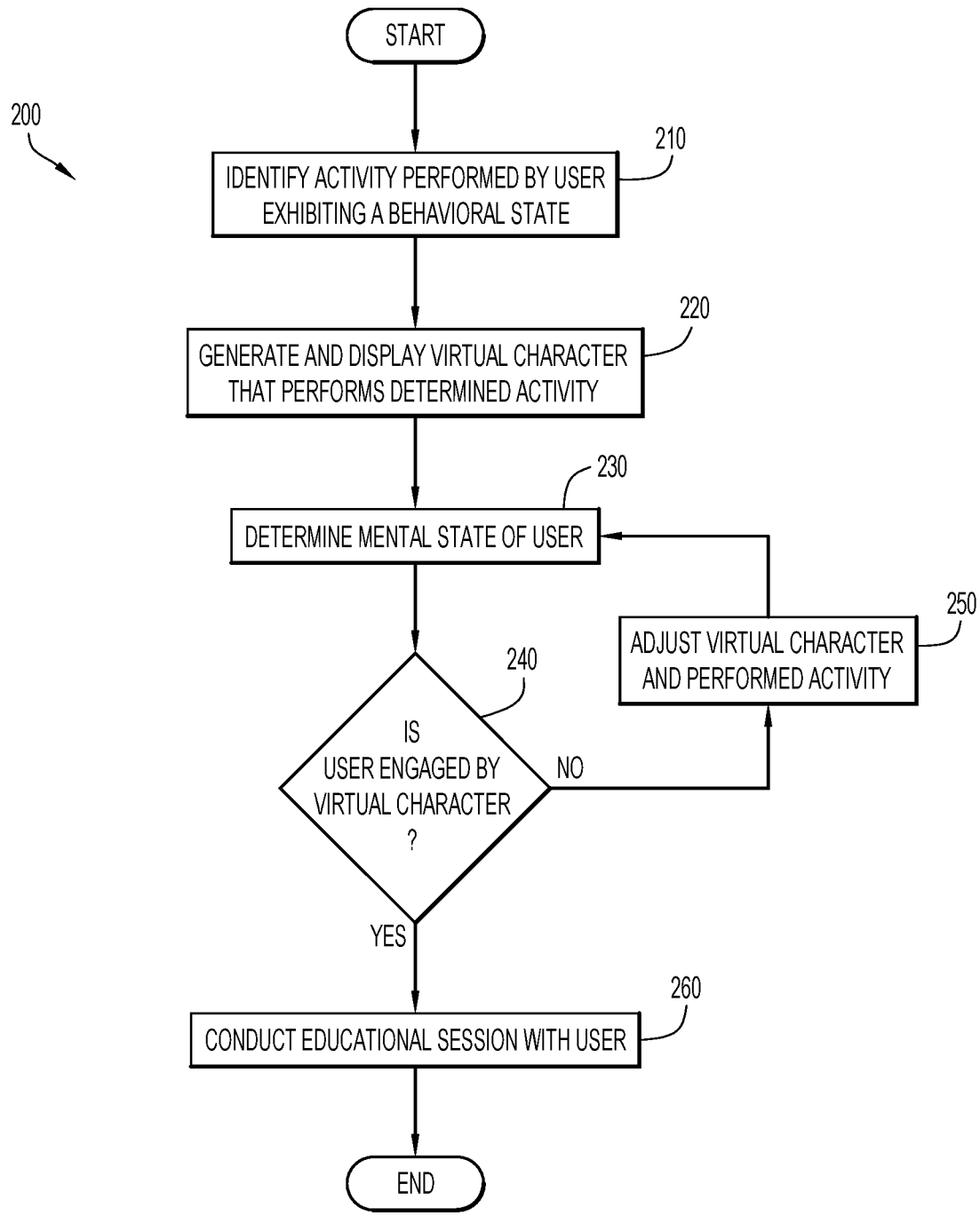
FIG. 2 is a flow chart depicting a method of providing a behavior-based interactive educational session in accordance with an embodiment of the present invention.

FIG. 2 is a flow chart depicting a method 200 of providing a behavior-based interactive educational session in accordance with an embodiment of the present invention.

An activity being performed by a user who exhibits a particular behavior state is identified at operation 210. A user may be monitored using camera 110 and/or microphone 120 of client device 105, and captured audio and video of the user may be processed by behavior profiling module 170 of server 155. In some embodiments, behavior profiling module 170 identifies repetitive actions of a user, such as rocking or swaying of the body, fidgeting, manipulating objects, and the like. Additionally or alternatively, activities that are performed by the user may be identified manually by a caretaker. For example, keywords that identify the repeated behavior, such as "spinning objects" or "swaying" can be manually provided.

A virtual character is generated and displayed at operation 220. Character module 175 may generate the virtual character for display on display 125 of client device 105. The virtual character may be generated based on information provided about a user, such as the user's interests. If a list of keywords has been manually provided, behavior profiling module 170 may search locations on a network, such as an intranet or the Internet, in order to find examples of media depicting the described actions. Media relating to the virtual character may be selected in order to animate the virtual character, as depicted and described in further detail with respect to FIG. 3. Once media relating to the virtual character is selected, character module 175 may generate animations of the virtual character performing the same identified actions that were performed by the user.

A mental state of the user is determined at operation 230. Behavior profiling module 170 may use conventional or other image processing techniques to process images of the user. In particular, behavior profiling module 170 may determine whether the virtual character has captured the user's attention. For example, behavior profiling module 170 may use gaze tracking to determine that a user is observing the virtual character. In some embodiments, behavior profiling module 170 identifies features such as pupil dilation and facial expressions of a user in order to determine whether the user is engaged by the virtual character.

Operation 240 determines whether the user is engaged by the virtual character. If the user is engaged, method 200 proceeds to operation 260 and an educational session is initiated. If the user is not engaged, method 200 proceeds to operation 250.

The virtual character and/or activities performed by the virtual character are adjusted at operation 250. In order to better engage the user, character module 175 may iterate through several different virtual characters, and/or character module 175 may iterate through several different actions performed by a virtual character, while the user's reactions are analyzed using behavior profiling module 170. Character module 175 may iterate through different virtual characters and/or activities performed by the virtual character until the user begins repeating the natural language terms being taught by the virtual character. In some embodiments, character module 175 adjusts the virtual character and/or activities performed by the virtual character until the user achieves a positive mental state, as determined by behavior profiling module 170. One or more machine learning models may be utilized to refine the virtual character and/or activities performed by the virtual character in order to maximize user engagement.

An educational session is conducted with the user at operation 260. With the user engaged, communication session module 145 may present a lesson to the user. The content of the educational lesson may include teaching natural language terms, such as words and phrases, to a user. In some embodiments, the virtual character is animated and speech is synthesized in order to present the educational lesson. During the educational session, words and/or phrases may be presented to a user. Educational module 180 may analyze data collected by camera 110 and/or microphone 120 in order to determine whether the user is repeating the words and/or phrases. In order to complete an educational session, various operations of method 200 may be repeated in order to maintain the user's engagement. In some embodiments, a user's reactions during previous educational sessions are analyzed using conventional or other machine learning techniques to track a user's learning progress over time. Based on the analysis of a user's reactions, communication session module 145 may accordingly adjust the educational lesson delivered.

Figure 3:
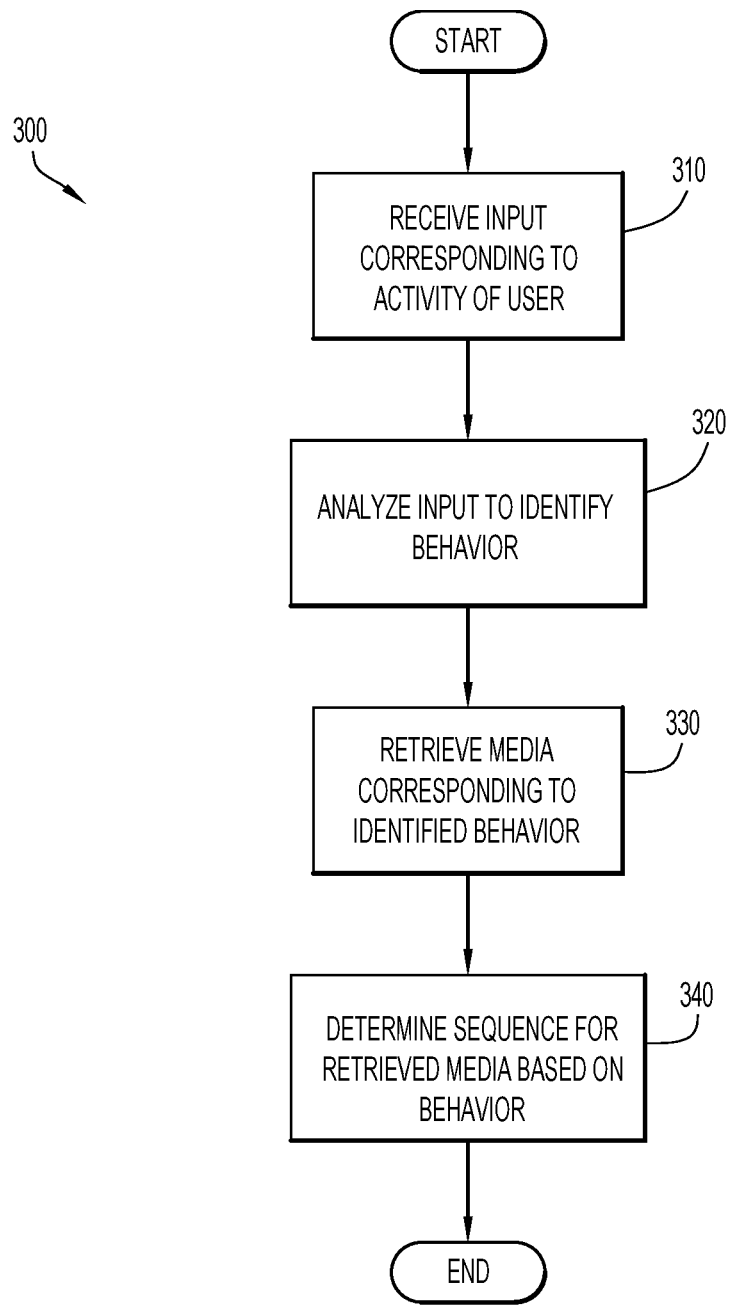
FIG. 3 is a flow chart depicting a method of selecting media for a behavior-based interactive educational session in accordance with an embodiment of the present invention.

FIG. 3 is a flow chart depicting a method 300 of selecting media for a behavior-based interactive educational session in accordance with an embodiment of the present invention.

Input corresponding to an activity of a user is received at operation 310. The input may be manually defined using keywords that describe a user's behavior, or video and audio of the user may be recorded by a caretaker and submitted. In some embodiments, the input is collected via camera 110 and microphone 120 of client device 105.

The input is analyzed to identify behavior of the user at operation 320. Video and audio of a user may be processed by behavior profiling module 170 to identify any repetitive actions performed by a user. Media corresponding to the identified behavior is then retrieved at operation 330. Character module 175 may query one or more databases, such as database 185, using the manually-provided keywords and/or actions identified by behavior profiling module 170 in order to search for media depicting the described actions. One or more k-nearest neighbors algorithms or decision tree algorithms may be utilized to determine the similarity of media to the identified user behavior.

A sequence for the retrieved media is determined based on the user's behavior at operation 340. One or more k-nearest neighbors algorithms or decision tree algorithms may be utilized to arrange the media in a particular order or sequence in order to optimize a virtual character's animations for user engagement. When character module 175 determines a sequence, a virtual character may be generated that performs animations in the order of the determined sequence.

Figure 4:
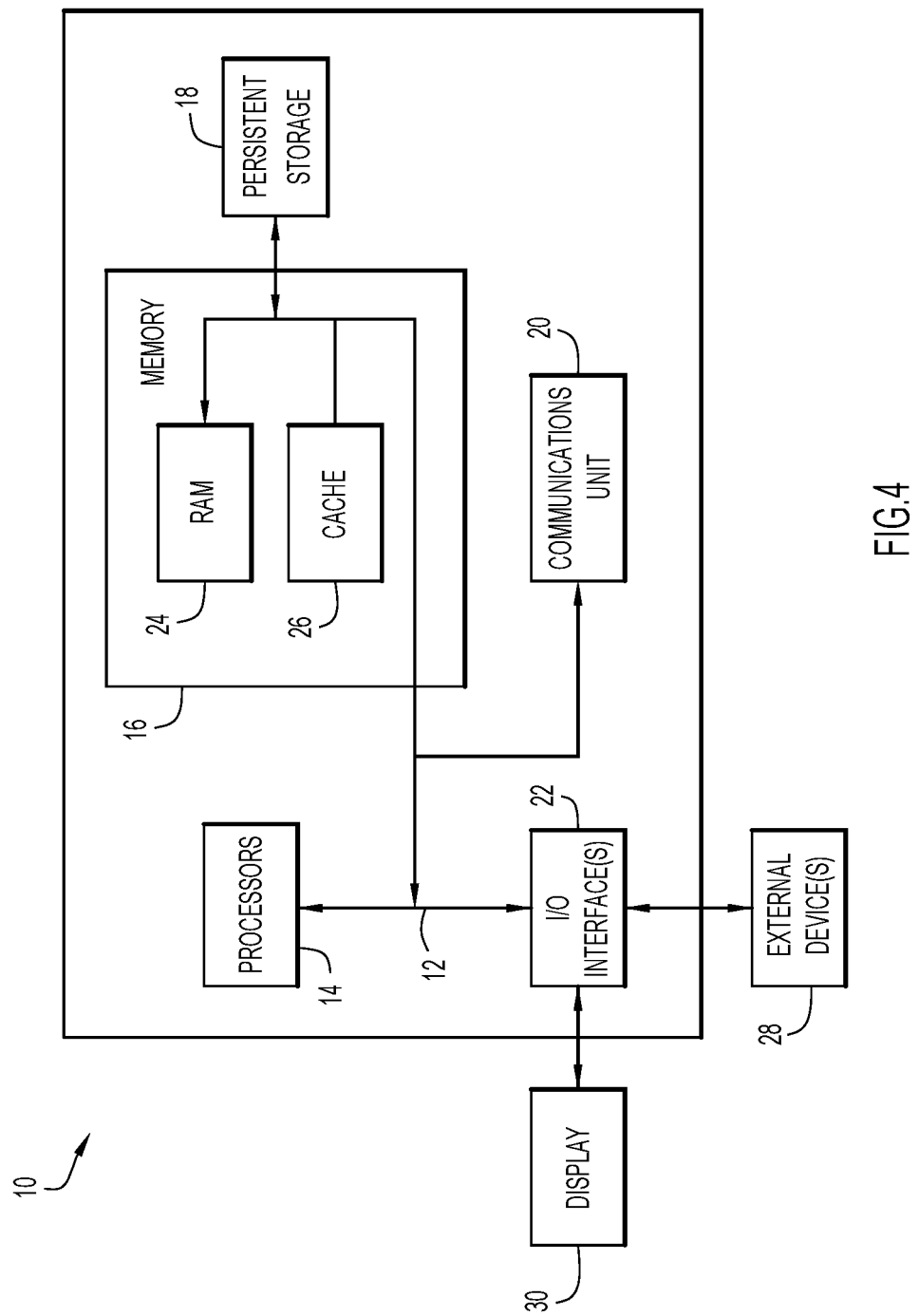
FIG. 4 is a block diagram depicting a computing device in accordance with an embodiment of the present invention.

FIG. 4 is a block diagram depicting components of a computer 10 suitable for executing the methods disclosed herein. Computer 10 may enable client device 105 and server 155 to present behavior-based interactive educational sessions in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to behavior-based interactive educational sessions may be stored within any conventional or other data structures (e.g., files, arrays, lists, stacks, queues, records, etc.) and may be stored in any desired storage unit (e.g., database, data or other repositories, queue, etc.) The data transmitted between client device 105 and server 155 may include any desired format and arrangement, and may include any quantity of any types of fields of any size to store the data. The definition and data model for any data relating to providing behavior-based interactive educational sessions may indicate the overall structure in any desired fashion (e.g., computer-related languages, graphical representation, listing, etc.).

Data relating to behavior-based interactive educational sessions, such as user interest data, identified user behavior data, virtual character data, educational data, and program instructions for conducting educational sessions, may include any information provided to client device 105 and/or server 155. Data relating to behavior-based interactive educational sessions may include any desired format and arrangement, and may include any quantity of any types of fields of any size to store any desired data. The fields may indicate the presence, absence, actual values, or any other desired characteristics of the data of interest (e.g., quantity, value ranges, etc.). Data relating to behavior-based interactive educational sessions may include all or any desired portion (e.g., any quantity of specific fields) of any data of interest within a given implementation or system. Data relating to behavior-based interactive educational sessions may indicate the overall structure in any desired fashion (e.g., computer-related languages, graphical representation, listing, etc.).

Data relating to behavior-based interactive educational sessions may include any data, such as data that is made available over time, or an amount of data that is available immediately. A computing environment for conducting behavior-based interactive educational sessions may perform any operation on any data that it processes.

The present invention embodiments may employ any number of any type of user interface (e.g., Graphical User Interface (GUI), command-line, prompt, etc.) for obtaining or providing information (e.g., user interests, user behavior information, educational information, virtual character information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing embodiments for conducting behavior-based interactive educational sessions.

The computing environment of present invention embodiments may include any number of computer or other processing systems (e.g., client or end-user systems, server systems, nodes, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially-available operating system and any combination of commercially available and custom software (e.g., communications software, server software, communication session module 145, behavior profiling module 170, character module 175, educational module 180, etc.). These systems may include any types of monitors and input devices (e.g., keyboard, mouse, voice recognition, etc.) to enter and/or view information.

It is to be understood that the software (e.g., communications software, server software, communication session module 145, behavior profiling module 170, character module 175, educational module 180, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., communications software, server software, communication session module 145, behavior profiling module 170, character module 175, educational module 180, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., user interest data, identified user behavior data, virtual character data, educational data, and program instructions for conducting educational sessions, etc.). The database system may be implemented by any number of any conventional or other databases, data stores or storage structures (e.g., files, databases, data structures, data or other repositories, etc.) to store information (e.g., user interest data, identified user behavior data, virtual character data, educational data, and program instructions for conducting educational sessions, etc.). The database system may be included within or coupled to the server and/or client systems. The database systems and/or storage structures may be remote from or local to the computer or other processing systems, and may store any desired data (e.g., user interest data, identified user behavior data, virtual character data, educational data, and program instructions for conducting educational sessions, etc.).

The present invention embodiments may employ any number of any type of user interface (e.g., Graphical User Interface (GUI), command-line, prompt, etc.) for obtaining or providing information (e.g., any data provided to and/or generated by a computing environment for providing behavior-based interactive educational sessions), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, in a data processing system comprising at least one processor and at least one memory, the at least one memory comprising instructions executed by the at least one processor to cause the at least one processor to interact with a user with a behavioral state, the method comprising:
   determining, via the at least one processor, an activity performed by an entity with a behavioral state, wherein the determined activity is provided by a caretaker of the entity, and wherein the determined activity comprises a repetitive action;
   generating and displaying, via the at least one processor, a virtual character corresponding to the entity and performing the determined activity of the entity, wherein the virtual character is displayed via an augmented reality display device, and wherein the virtual character is rendered in a three-dimensional environment of the entity;
   detecting, via the at least one processor, a mental state of the entity responsive to the virtual character; and
   in response to detection of a positive mental state of the entity, providing, via the at least one processor, one or more natural language terms selected from a predetermined lesson plan to the entity corresponding to the activity performed by the virtual character, wherein the virtual character is animated to present the one or more natural language terms to the entity.

2. The method of claim 1, wherein determining the activity further comprises:
   receiving information from a user pertaining to the activity.

3. The method of claim 1, wherein generating the virtual character further comprises:
   detecting, via the at least one processor, the mental state of the entity via one or more sensing devices in response to display of the virtual character; and
   iterating through, via the at least one processor, performed activities of the virtual character until detection of a positive mental state of the entity.

4. The method of claim 1, further comprising:
   iterating through, via the at least one processor, displayed virtual characters and corresponding activities performed by the displayed virtual characters until the entity repeats the provided one or more natural language terms and attains the positive mental state.

5. The method of claim 1, wherein the entity includes a child and the behavioral state includes autism.

6. The method of claim 1, wherein the activity includes one or more from a group of: generating sounds and manipulating an object.

7. The method of claim 1, further comprising:
   receiving information from a user pertaining to the virtual character.

8. A computer system for interacting with a user with a behavioral state, the computer system comprising:
   one or more computer processors;
   one or more computer readable storage media;
   program instructions stored on the one or more computer readable storage media for execution by at least one of the one or more computer processors, the program instructions comprising instructions to:
   determine an activity performed by an entity with a behavioral state, wherein the determined activity is provided by a caretaker of the entity, and wherein the determined activity comprises a repetitive action;
   generate and display a virtual character corresponding to the entity and performing the determined activity of the entity, wherein the virtual character is displayed via an augmented reality display device, and wherein the virtual character is rendered in a three-dimensional environment of the entity;
   detect a mental state of the entity responsive to the virtual character; and
   in response to detection of a positive mental state of the entity, provide one or more natural language terms selected from a predetermined lesson plan to the entity corresponding to the activity performed by the virtual character, wherein the virtual character is animated to present the one or more natural language terms to the entity.

9. The computer system of claim 8, wherein the instructions to determine the activity further comprise instructions to:
receive information from a user pertaining to the activity.

10. The computer system of claim 8, wherein the instructions to generate the virtual character further comprise instructions to:
detect the mental state of the entity via one or more sensing devices in response to display of the virtual character; and
iterate through performed activities of the virtual character until detection of a positive mental state of the entity.

11. The computer system of claim 8, further comprising instructions to:
iterate through displayed virtual characters and corresponding activity performed by the displayed virtual characters until the entity repeats the provided one or more natural language terms and attains the positive mental state.

12. The computer system of claim 8, wherein the entity includes a child and the behavioral state includes autism.

13. The computer system of claim 8, wherein the activity includes one or more from a group of: generating sounds and manipulating an object.

14. A computer program product for interacting with a user with a behavioral state, the computer program product comprising one or more computer readable storage media collectively having program instructions embodied therewith, the program instructions executable by a computer to cause the computer to:
determine an activity performed by an entity with a behavioral state, wherein the determined activity is provided by a caretaker of the entity, and wherein the determined activity comprises a repetitive action;
generate and display a virtual character corresponding to the entity and performing the determined activity of the entity, wherein the virtual character is displayed via an augmented reality display device, and wherein the virtual character is rendered in the three-dimensional environment of the entity;
detect a mental state of the entity responsive to the virtual character; and
in response to detection of a positive mental state of the entity, provide one or more natural language terms selected from a predetermined lesson plan to the entity corresponding to the activity performed by the virtual character, wherein the virtual character is animated to present the one or more natural language terms to the entity.

15. The computer program product of claim 14, wherein the program instructions to generate the virtual character further cause the computer to:
detect the mental state of the entity via one or more sensing devices in response to display of the virtual character; and
iterate through performed activities of the virtual character until detection of a positive mental state of the entity.

16. The computer program product of claim 14, further comprising program instructions to:
iterate through displayed virtual characters and corresponding activity performed by the displayed virtual characters until the entity repeats the provided one or more natural language terms and attains the positive mental state.

17. The computer program product of claim 14, wherein the activity includes one or more from a group of: generating sounds and manipulating an object.

\* \* \* \* \*